Aug. 12, 1930.                J. A. TRAYLOR                    1,772,596
                        ELECTRIC RECIPROCATING MOTOR
                            Filed July 16, 1923            4 Sheets-Sheet 1
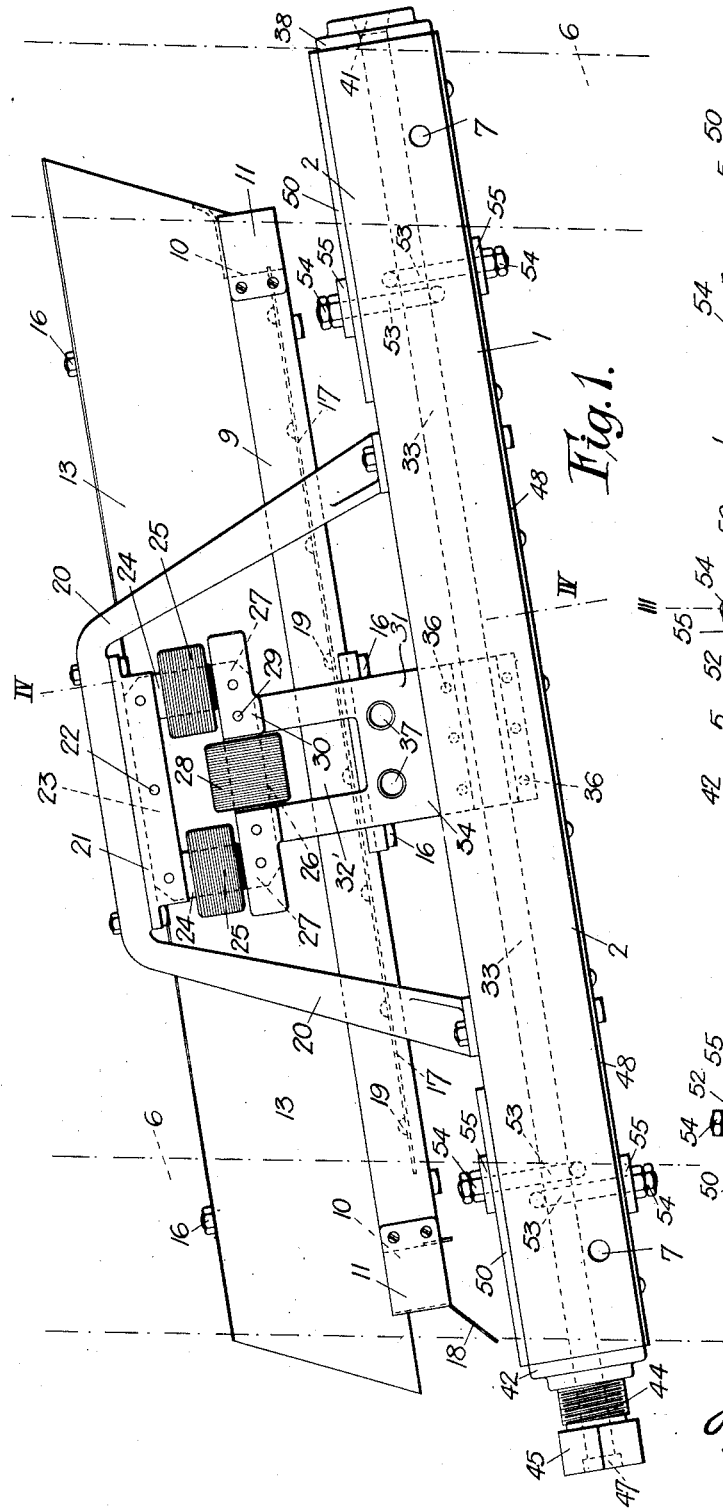
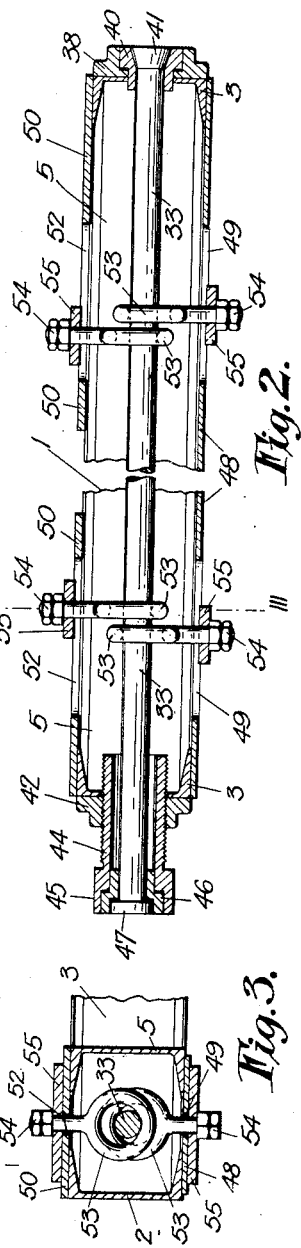
Inventor
John A. Traylor
By Marks&Clerk
Attorneys.

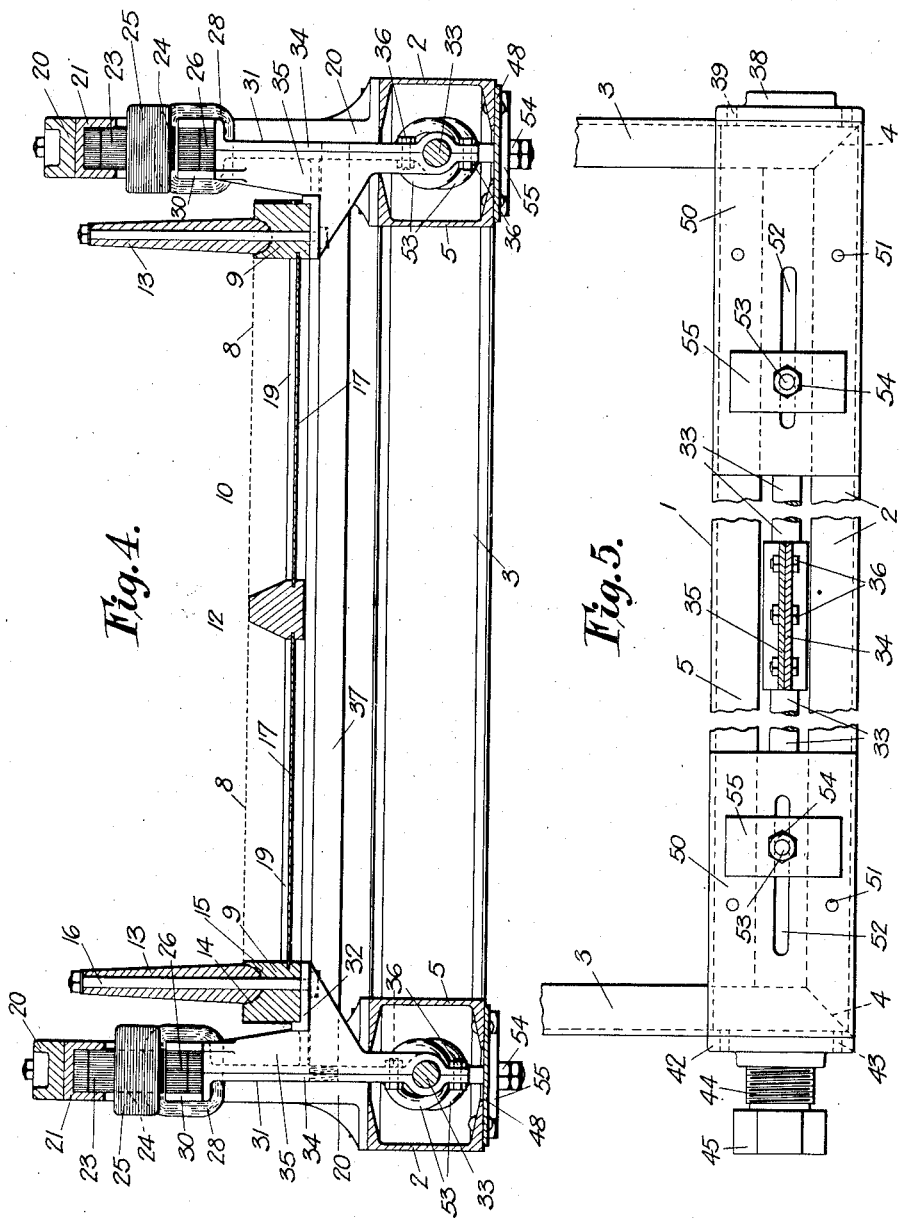

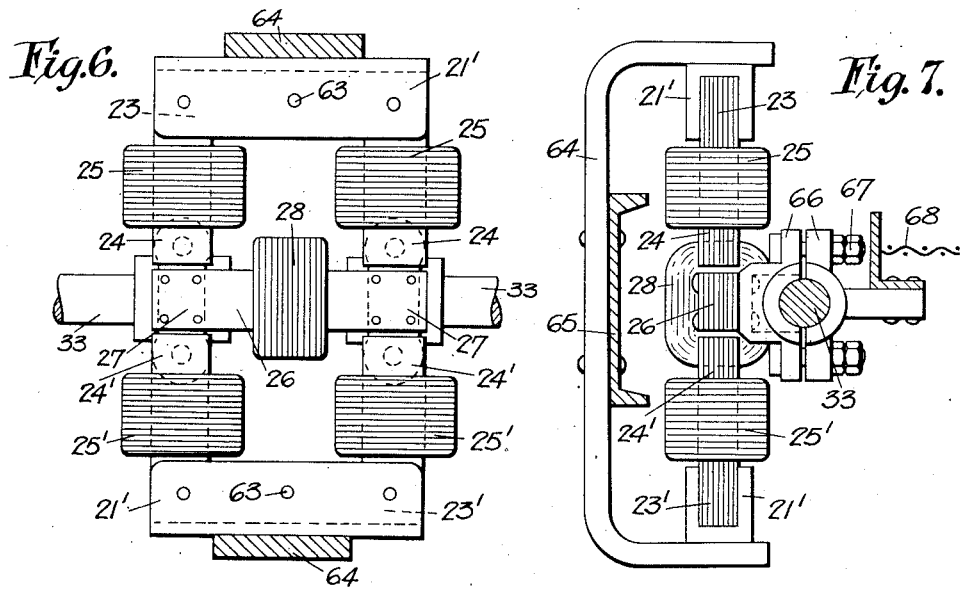
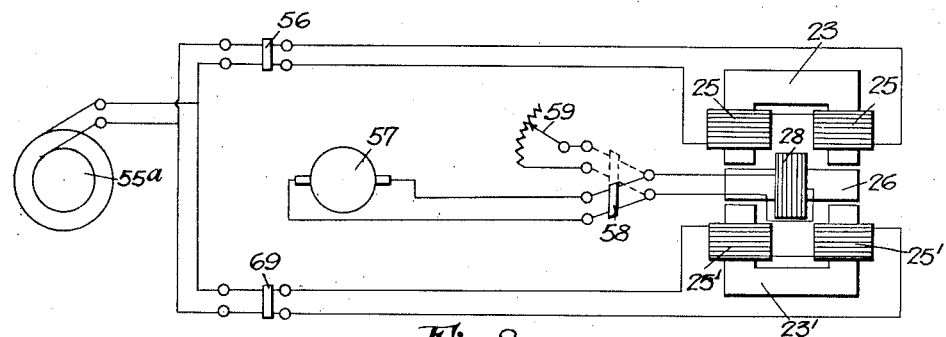
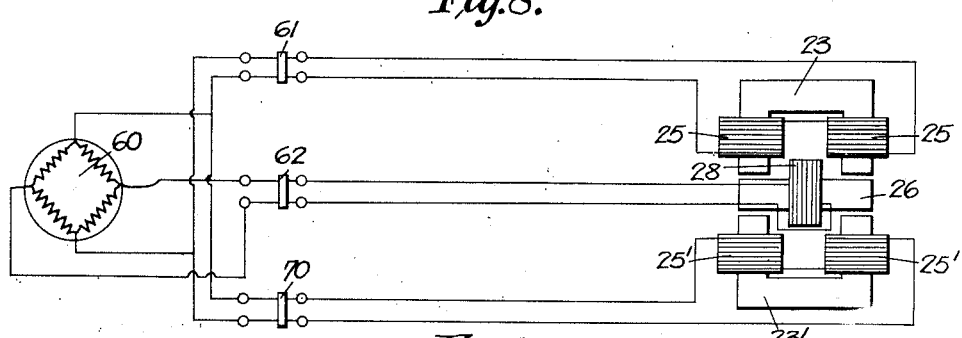

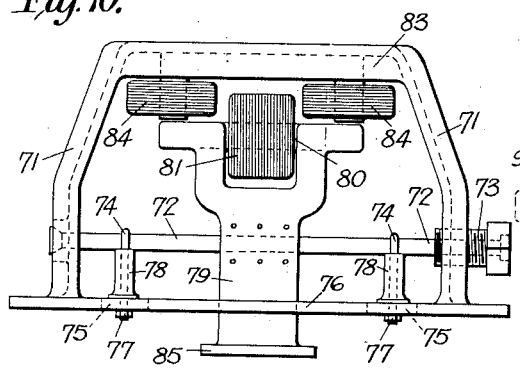
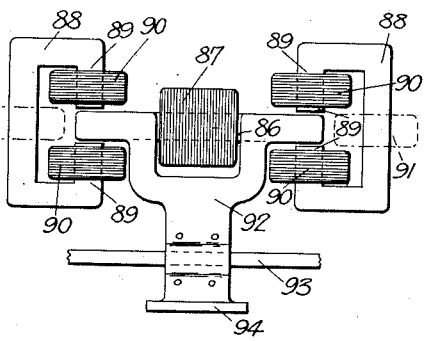
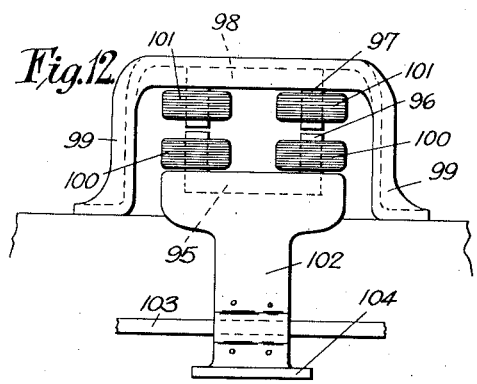
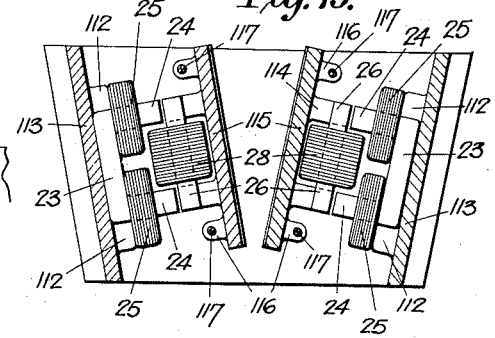
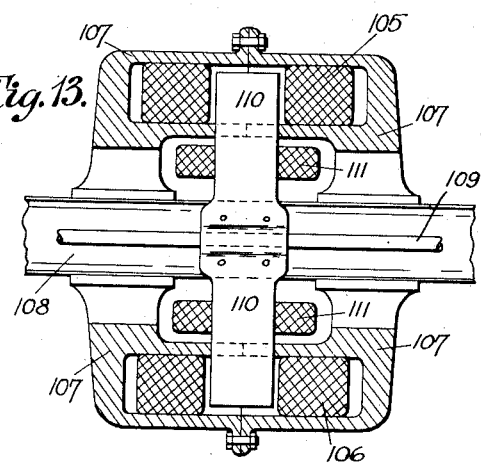

Patented Aug. 12, 1930

1,772,596

UNITED STATES PATENT OFFICE

JOHN A. TRAYLOR, OF TIGER, COLORADO, ASSIGNOR TO THE TRAYLOR VIBRATOR COMPANY, OF DENVER, COLORADO, A CORPORATION OF COLORADO

ELECTRIC RECIPROCATING MOTOR

Application filed July 16, 1923. Serial No. 651,742.

This invention relates to an improved electric reciprocating motor adapted when energized by supplying electric current thereto to produce rapid reciprocation or vibration of the movable element or armature of the motor.

The improved motor according to the present invention is capable of general use and application, in fact it may be used in practically any case in which a reciprocatory or vibratory movement is required, although at the present time it is considered that the motor finds its most useful and important application in the reciprocation, vibration, oscillation, or gyration of material treating members, such as the screens of vibratory separating or concentrating apparatus for ores or other materials; the jaws of ore, rock or other crushers, or the crusher heads of gyratory crushers. The invention is not, however, restricted to these particular uses, as many other uses therefor may be found.

The main object of the invention is to provide an improved electric reciprocating motor of extremely simple construction and arrangement, very compact in size, and which will operate with the maximum of efficiency and with a minimum consumption of power, to produce any required number of reciprocations or vibrations in a given time interval, according to the purposes for which it is intended, and particularly is capable of producing in an efficient and economical manner reciprocations or vibrations of very high frequency, in the various arts to which it may be applied as for example, in the operation of material treating apparatus, drilling or riveting machines, massage apparatus, or the like.

The electric reciprocating motor according to the present invention comprises a reciprocable element and electro-magnetic means for imparting to said element movements at a given frequency, and means connected with said element and having a natural period of oscillation or reciprocation synchronous with the frequency of the movements imparted to said element by said electro-magnetic means.

In the preferred forms of the invention means are provided for adjusting or varying the natural period of oscillation or reciprocation of the aforesaid means in order to bring the same into synchronism with different frequencies of movement imparted to the reciprocable element by said electro-magnetic means. This may be effected by varying the tension under which said means is placed, or by varying the length of said means which is free to oscillate or reciprocate.

The said means in its preferred form comprises a tension bar which is held or anchored at its ends and is connected with the reciprocable element intermediate its ends and means are provided for adjustably longitudinally tensioning said bar together with means establishing or fixing a delimited length thereof free to oscillate or vibrate.

The invention also comprises an electric reciprocating motor which comprises cooperating electro-magnetic means, one of which is suitably supported while the other is connected with a reciprocable element, means being provided for supplying alternating current to one of said electro-magnetic means and current other than current of the same phase to the other of said means. The last mentioned current may be alternating current of different phase or may be direct current.

The improved electric motor forming the subject matter of the present invention will now be more fully described with reference to different forms or modifications thereof and with reference to different applications thereof, although it is to be understood that these are merely described by way of example and are not restrictive of the invention.

In the accompanying drawings Figure 1 shows in side elevation one form of the improved motor in its application to a vibratory screen for screening materials of various kinds.

Figure 2 is a sectional view of part of the frame of che vibratory screen showing the tension element and means for adjusting same.

Figure 3 is a sectional view taken on the line III—III of Figure 2.

Figure 4 is a transverse sectional view taken approximately on the line IV—IV of Figure 1.

Figure 5 is a plan view of one side of the framework of the vibratory screen.

Figure 6 is a side elevation showing a modified form of the electric motor.

Figure 7 is an end view of the motor shown in Figure 6.

Figure 8 is a diagrammatic view of the connections for energizing the electro-magnets of a motor of either of the forms illustrated in the preceding figures.

Figure 9 is a diagrammatic view showing alternative connections for energizing the electro-magnets of the motor.

Figures 10, 11, 12 and 13 are diagrammatic views showing other modified forms of the motor according to the present invention.

Figures 14 and 15 are plan and sectional elevational views respectively illustrating diagrammatically the application of the motor to an oscillating jaw crusher for ores or other materials.

Referring firstly to the motor operated vibrating screen illustrated in Figures 1 to 5, the construction comprises a stationary framework 1 which is made up of side members 2 and end members 3 of channel shaped cross section which are preferably welded together at the meeting ends thereof as at 4 in Figure 5. Spaced inwardly from each side frame member 2 is another frame member 5 also of channel shape which is secured by welding or otherwise at its ends to the end frame members 3. The frame members 2 and 5, as shown particularly in Figures 3 and 4 are reversely positioned as to their channel shaped cross sections to form an enclosing housing for the resilient tension rod hereinafter referred to. This stationary frame, which is substantially rectangular in form, is suitably supported in a suitably inclined position as shown in Figure 1, by being bolted or otherwise secured to the uprights 6 of a suitable supporting structure which uprights are shown in dotted lines in Figure 1. Apertures for the passage of the securing bolts, or the like, through the side members of the framework are indicated at 7 in Figure 1.

The screening material itself, which is indicated at 8 in Figure 4, is secured upon a suitable framework, which may be made of wood or other suitable material, and which comprises side members 9 and end members 10 suitably secured together and reinforced at the corners or ends by metallic angle members 11. To strengthen the frame a central member 12 is preferably provided secured at its ends to the end members 10. The screening material 8 is suitably stretched over the framework and is secured thereon by tacks or other suitable means.

It is preferred also to securely hold the screening material along the side edges thereof, and to stretch the same taut, by means of the upstanding side members 13 of the screen frame, which for this purpose are rounded or otherwise suitably shaped at their lower ends 14 to fit into correspondingly shaped longitudinal recesses 15 formed in the upper surfaces of the screen frame members 9. The side members 13 of the screen frame are secured to said frame by means of bolts 16 passing through the side frame members 9 and through said side members 13 as shown most clearly in Figure 4.

In wet screening, there are provided, below the screening material 8 and mounted at their side edges in recesses in the frame members 9 and 12, plates 17 which at their forward ends terminate short of the end member 10 of the frame so as to provide a discharge outlet. The material which travels forwardly over the screening material 8 is discharged at the forward end of the frame which may be provided with a suitable deflecting plate 18. The plates 17 may, if desired, be provided with riffles 19.

The screen frame 9, 10, is reciprocated or vibrated by the improved reciprocating motor in accordance with the present invention and which will now be described.

Secured upon the side frame members 2 and 5 of the stationary framework there is a supporting bracket 20 of substantially inverted U shape, to the under side of the upper portion of which is secured an inverted channel shapped member 21, preferably made of brass, within which is secured by bolts, rivets or the like 22 the web or body portion of a laminated core 23 of inverted U shape having the downwardly extending poles 24. Upon each of these poles is mounted an energizing coil 25 which coils are connected in series with a suitable source of electric current as later described.

Beneath the core 23 is another laminated core 26, the poles 27 of which are spaced a suitable distance from the lower surfaces of the poles 24 of the core 23 and this core 26 has mounted centrally thereon an energizing coil 28 which may be connected with a suitable source of electric current as later described.

The core 27 is secured by bolts, rivets or the like, 29 within the upper channel shaped portion 30 of a reciprocable element or bracket 31, preferably made of brass, and which is bifurcated at 32' to permit the mounting of the coil 28 upon the core.

The reciprocable element or bracket 31 is provided at the inner side thereof with a supporting ledge or flange 32 upon which rests the adjacent side member 9 of the screen frame and to which said side member is secured in any suitable manner as by means of two of the bolts 16 which pass through suitable apertures in said supporting ledge.

Arranged within the enclosing housing formed by the side frame members 2 and 5 is an elastic or resilient tension element or rod 33 which is securely held or anchored at its opposite ends by or in the end frame members 3. The reciprocable element or bracket 31 is securely clamped or connected to the tension rod 33 intermediate the ends thereof. The reciprocable element may be so clamped or connected in any suitable manner but in the construction of the bracket shown in the drawings the same is formed in two parts 34, 35, which are of similar construction excepting that one of them, namely part 35 is provided with the supporting ledge 32. Adjacent the lower end of each part 34, 35, of the bracket it is provided with a semi-circular recess adapted to fit about the tension rod 33 so that when the two parts are fitted together, as shown in Figure 4, and are secured together in contacting relation by bolts or the like 36, the bracket as a whole will be securely held upon the tension rod. It will of course be understood that an electric reciprocating motor in the case of the vibrating screen illustrated in Figures 1 to 5 is provided on each side of the screen structure so that both sides of the screen frame will be reciprocated or vibrated in unison, and in order to hold the two reciprocable brackets 31 in proper relation and alignment the two brackets are connected by spanners 37 which may consist of lengths of pipe threaded at their ends into correspondingly threaded apertures in the brackets.

Referring particularly to Figures 2, 3 and 5 of the drawings which show the details of construction and arrangement of the tension rods and associated parts, it will be noted that the tension rod is held or anchored at one end thereof by means of a bracket or plate 38 positioned against the end frame member 3 by means of dowel pins 39 or the like. This bracket or plate is provided with a countersunk bore within which is arranged a shouldered bushing 40 the bore of which is outwardly flared at its outer end to receive the conical head 41 formed on the tension rod. At the other end of the supporting framework is a bracket or plate 42 positioned against the other end frame member 3 by the dowel pins 43 which bracket or plate is provided with a screw threaded aperture within which engages a screw threaded adjusting member or sleeve 44 having a square hexagonal or other head 45. The bore of the sleeve 44 is countersunk at its outer end to receive a shouldered bushing 46, the bore of which is also countersunk to receive the head 47 formed on this end of the tension rod. It will be seen that with this arrangement adjustment of the sleeve 44 outwardly within the threaded bore of the bracket 42 will through the bushing 46 and head 47 on the tension rod tend to move this end of the tension rod away from the other end thereof, which is anchored or held by means of the head 41 within the bushing 40 and bracket 38 so that the tension rod will be placed under a greater degree of tension. Similarly by adjusting the sleeve 44 inwardly within the threaded bore of the bracket 42, the tension under which the rod is placed may be reduced. The bushings 40 and 46 are preferably formed in halves or sections, so that in assembling the parts the heads 41, 47 of the rod may be passed through the bores of the plate 38 and member 44 and the bushings then inserted in place and the parts tightened up.

It will be understood that the tension element or rod 33, being anchored at both ends thereof, will have a definite natural period of oscillation and that by increasing or decreasing the tension under which the rod is placed by means of the adjusting sleeve 44 its natural period of oscillation may be varied within certain limits for the purpose hereinafter mentioned.

It has been found desirable in some cases to provide additional means for adjusting or determining the natural period of oscillation of the tension element or rod in order to provide a wider range of adjustment or to render the adjustment more delicate, and the means shown for this purpose comprises devices adapted to establish or fix a definite delimited length of the tension element or bar which is free to oscillate or vibrate, such devices being adjustable to permit the delimited length to be varied to thereby vary the period of oscillation.

Such devices are shown in Figures 2, 3 and 5 from which it will be noted that a plate 48 is provided beneath and riveted or otherwise secured to the flanges of the side frame members 2 and 5, this plate having adjacent each end of the frame an elongated slot 49. At the upper part of the frame and at each end thereof there is provided a plate 50 which is held in position by means of dowel pins 51 entering corresponding apertures in the frame members 2 and 5 said plate being provided with an elongated slot 52 similar to and above the slot 49. Passing downwardly through the slot 49 and upwardly through the slot 52 are the stems of two eye bolts 53 the heads of which surround the tension element 33 preferably having openings of greater diameter than said tension element, as shown in Figure 3. Nuts 54 are threaded on the outer ends of the bolts and washer plates 55 are preferably interposed between the nuts and the plates 49, 50. It will be seen that by tightening up the nuts 54 the one eye bolt 53 will draw upwardly against the tension rod and the other eye bolt 53 will draw downwardly against said rod and as the two bolts are immediately adjacent each other the tension rod will be securely held or clamped at that point. With the two sets of eye bolts adjacent opposite end portions of the tension element a definite length of the tension element or rod will thus be delimited between the sets of eye bolts and by loosening the nuts 54 and moving the two sets of eye bolts toward or away from each other the length of the tension rod which is delimited when the nuts 54 are against tightened may be varied within relatively wide limits. Thus the length of the tension element which is free to oscillate may be readily varied in order to vary the period of oscillation of the tension element.

In Figure 8, the connections for energizing the electro-magnets are diagrammatically shown in full lines, the cores and coils of the electro-magnets being lettered the same as in Figures 1 and 4. In the arrangement shown the coils 25 on the core 23 are connected in series with a source 55ª of alternating current of any suitable frequency, the source shown being a single phase alternating current generator, the connection being made through a switch 56. The coil 28 on the core 26 is connected to a source of direct current 57 shown as a direct current generator, the connection being made through switch 58.

With this arrangement, when the electro-magnet 26, 28, is energized, the core 26 will be maintained at a constant polarity, say for example, north at the left and south at the right and when the electro-magnet 23, 25, is energized it will be rendered alternately of the same polarity as and of opposite polarity to the core 26, that is when the current is flowing in one direction the right pole 24 will be of north polarity while the left pole 24 will be of south polarity so that the two cores will be attracted toward each other while when the current is flowing in the reverse direction the left pole 24 will be of north polarity and the right pole 24 will be of south polarity so that the cores will repel each other. Thus the core 23 being held stationary by the bracket 20, the movable core 26 carried by the reciprocable element or bracket 31 will be alternately attracted toward and repelled from the core 23 and these attractive and repulsive forces will occur at a given frequency. When the core 26 is attracted the tension element 33 to which the bracket 31 supporting the screen frame 9, 10 is connected will be deflected upwardly from its normal central position, developing therein a restoring force tending to return it and the screen frame to said position, and when the core 26 is repelled the tension element will return to its normal central position due to the repelling forces and to its own restoring force, and will be deflected beyond its normal central position by said repelling forces and the inertia of the element and parts carried thereby to an oppositely flexed position again developing a restoring force therein. When the succeeding attractive force occurs the tension element, due to such force and its own restoring force and inertia of the parts carried thereby, will be moved back to and beyond its normal central position into its first deflected position, and this oscillation or vibration of the tension element will continue so long as the coils are energized and the alternate attractive and repulsive forces produced.

By means of the adjustable tensioning sleeve 44, which may be used to vary the tension of the rod as described, or by means of the adjustable eye bolts or the like, for delimiting the effective length of the tension rod or by means of both of these devices, the tension element may be very accurately adjusted so that it will maintain the particular weight to be vibrated, such as that of the screen frame, in vibratory movement in synchronism with the frequency of the impelling forces produced by the energization of the electro-magnets so that as long as the magnets are energized the particular screen frame or other means to be vibrated, will be reciprocated or vibrated at a definite or predetermined and uniform speed.

The provision of the tension element adjusted in this way to maintain a particular vibrating weight, such as that of the screen frame, in vibratory movement in synchronism with the frequency of the impelling or deflecting forces which will be imparted to said element by the electro-magnetic means, entirely prevents any possibility of lagging in the movements of the element and vibrating weight or screen frame and ensures that the screen frame or the like will be reciprocated at a predetermined and uniform speed for indefinite periods. As the screen frame is secured to the tension element or elements at opposite sides of the structure, this frame will vibrate with the said element or elements and thus the material upon the screen will be subjected to the reciprocatory or vibratory action of said screen.

The motor described will operate efficiently with a very low consumption of power which is due to the operation of the vibratory tension means in synchronized relation with the recurrent impelling forces produced and applied to the reciprocable element 26, 31 and said tension means due to the energization of the electro-magnets.

The direct current supplied to the coil 28 may be furnished by a direct current generator as described or it may be furnished by the same or another alternating current generator, the current being suitably rectified by any usual means.

It will be understood that if desired the alternating current could be supplied to the coil 28 and the direct current supplied to the coils 25 to produce the same results, or that instead of two coils 25 on the core 23 a single centrally arranged coil could be provided on this core in a similar manner to the coil 28 on core 26.

The motor may also be operated by supplying direct current to the coils of both cores 23, 26, and the supply of current to the coils interrupted at suitable intervals in order to produce successive attractive or successive repulsive forces operating on the reciprocable element 31, the restoring forces developed in the tension bar and the inertia of the moving parts being relied upon to effect the movement of the reciprocable element in the opposite direction to that in which said element is moved by said attractive or repulsive forces and in synchronism with the frequency of said forces.

By interrupting the direct current and alternately changing the direction of flow of the current through the coils, the cores could be so magnetized as to alternately attract and repel each other.

Also such recurrent attractive or repulsive forces acting on the reciprocable element and tension bar to move or deflect the same in one direction from its neutral position, might be produced by supplying alternating current to the coil or coils of one core and alternating current to an oppositely wound winding or windings on the other core; or by supplying alternating current to similarly wound windings on both cores and suitably interrupting the supply of current at suitable intervals; or by supplying alternating current, or interrupted direct current, to the winding or windings of one core and omitting the winding or windings on the other core, or cutting off the supply of current to the latter winding or windings, the restoring forces of the tension rod and the inertia of the parts connected thereto in such cases operating to move the reciprocable element in the direction opposite to the movement imparted thereto by said recurrent forces. In the case where the supply of current to the winding of one core is cut off, as by moving the switch 58 in Figure 8, this switch may be employed to complete the circuit of the coil through a resistance 59 which is preferably variable.

In the arrangement shown diagrammatically in Figure 9 current is supplied by a two phase alternating current generator 60, current of one phase being supplied through switch 61 to the coils 25 and current of the other phase being supplied through switch 62 to the coil 28. With this arrangement successive attractive and repulsive forces acting upon the reciprocable element will be produced.

It is also possible to mix the alternating and direct currents through a transformer or by other means and then to pass the resultant current through the coil or coils on one of the cores 23, 26, to produce recurrent or intermittent impelling forces operative upon the reciprocable element to deflect the tension element in one direction from its neutral position, the restoring forces developed in said element, and the inertia of the moving parts effecting the return of the parts to and the movement of the same beyond said neutral position to the opposite deflected position.

In the modified construction of the motor illustrated in Figures 6 and 7 a third core $23^1$, similar to the core 23 but in reversed position, is arranged beneath the core 26 and is provided with coils $25^1$ on the poles $24^1$ thereof. In this construction the cores 23, $23^1$ may be secured by bolts or the like 63 to inverted U-shaped members $21^1$, preferably of brass, carried by a yoke 64 which is in turn secured by riveting or the like to a supporting element or frame member 65 which may be part of a stationary framework similar to the framework 1 shown in Figures 1 to 5. The core 26 is riveted or otherwise secured to a reciprocable element, preferably made of brass, and comprising two half brackets 66 securely clamped by means of bolts 67 upon the tension rod 33 which may be similar in form to that already described anchored at its ends to the framework of which the frame member 65 forms a part and which may be provided with adjustable tensioning means or with adjustable length delimiting means or both as described with reference to the preceding construction. The reciprocable element 66 may be suitably attached to the member which is to be operated, for example, the screen frame 68 shown in Figure 7.

With this modified construction, and as shown in Figure 8, the coils $25^1$ may be provided with current of the same phase as that supplied to the coils 25 through a switch 69 the coils being wound so that each pole $24^1$ is of opposite polarity to the pole 24 at the same end of the core 23 so that while one core 23 or $23^1$ is attracting the core 26 the other core will be repelling the same. In the arrangement shown in Figure 9 the coils $25^1$ will be supplied with current of the same phase as that supplied to the coils 25 through switch 70, the coils being again wound to produce opposite polarities of the cores 23, $23^1$.

In cases where it is desired to produce a differential reciprocation of the reciprocable element, that is when it is desired to produce a greater force upwardly than downwardly or a greater force downwardly than upwardly, one or the other of the cores 23 or $23^1$ only may be magnetized the supply of current to the coils of the other core 23, $23^1$ being cut off by opening the corresponding one of the switches 56, 61, 69 or 70. This differential movement is found desirable in connection with the screening of certain materials. When both cores 23, $23^1$ are energized uniform reciprocatory movements are produced. When such differential motion is required the core 26 will not be energized, the supply of current to the coil 28 thereof being cut off by opening the switch 58 or 62 and if desired the circuit of said coil closed by means of said switch.

In the modification illustrated in Figure 10, a supporting frame 71 is provided together with a tension element 72 having its ends anchored in said frame and provided with an adjusting sleeve threaded into said frame in a manner similar to that already described with reference to the construction shown in Figures 1 to 5. Adjustable means for determining or establishing a delimited length of said tension element are also provided each of said means as shown comprising a bolt 74, the upper part of which surrounds the tension rod and the lower part of which passes through an elongated slot 75 in the base 76 of the frame and is provided with a nut 77 thereon. When the nut is tightened the tension element is securely held or clamped between the upper part of the bolt and a member or block 78 through which the bolt may pass. Adjustment of the bolts within the slots 75 permits a definite length of the tension element to be established or delimited and the tension of said element may be varied by adjustment of the threaded sleeve 73.

A reciprocable element 79 is securely clamped to the intermediate portion of the tension rod and this element at its upper portion carries a core 80 having a coil 81 thereon. A core 82 of inverted U shape is suitably secured to the upper portion 83 of the frame 71 and is provided with coils 84 on the poles thereof or a single coil may be provided upon the central part of this core.

The coils 84 and 81 may be supplied with current in any of the ways described in connection with the construction shown in Figures 1 to 5 in order to cause reciprocatory movement of the element 79 and this element may be connected with the member or mechanism to be operated as by means of a flange 85 thereon.

Another arrangement of the cores or electro-magnets is shown in Figure 11, in which the core 86 and coil 87 thereon are similar to those shown in Figures 1 and 10 and other cores 88 of substantially C form are provided having the poles 89 thereof arranged at opposite sides of the opposite ends of the core 86. A coil 90 may be arranged on each pole 89 or a single central coil may be provided for each core 88. It will of course be understood that the cores 88 are supported by a suitable framework and that the reciprocable element 92 carrying the core 86 is securely clamped or connected to the tension rod 93 which will be supported at its ends by the frame and provided with adjustable tensioning means or with adjustable length delimiting or tuning means as hereinbefore described. The element 92 will also be adapted for connection with the member to be operated as by the flange 94.

Assuming that alternating current is supplied to the coils 90 and direct current is supplied to the coil 87 the core 86 will be of constant polarity and the poles 89 of each core 88 will be of opposite polarity, the two cores 88 being the same polarity and being reversed at each reversal of the alternating current. The windings on the cores 88 are arranged to produce these results so that the poles 89 above the core 86 will attract the core while the poles below the same are repelling the core and vice versa.

The current may be supplied to the coils in other ways in order to produce the recurrent attractive or repulsive forces as will be readily understood from what has been said heretofore.

The construction illustrated in Figure 12 is generally similar to that shown in Figures 1 and 10, excepting that the lower core 95 is of U shape and is provided with upstanding poles 96 which are positioned beneath the poles 97 of the upper inverted U shaped core 98 which is secured to the upper portion of the bracket or support 99. The coils 100 are arranged upon the poles 96 and the coils 101 are arranged on the poles 97 and these coils may be supplied with current in order to magnetize the respective cores in any of the ways already described with reference to the coils 25 and 28 of the construction shown in Figure 1. Instead of providing the coils on the poles of the cores 95, 98, a single centrally arranged coil may be employed on each core. The reciprocable element 102 is secured to a tension rod 103 similar to those already described with reference to Figures 1 and 10 and said element may also be provided with a connecting flange 104.

Figure 13 shows a further modification of the electric reciprocating motor in accordance with the present invention in which there are provided coils 105, 106, which are supported by suitable coil supporting brackets 107 secured above and below a suitable framework 108. A tension rod 109 is also provided which may be anchored at its ends in the frame 108 and may be provided with adjustable tensioning means or adjustable length delimiting means or both as already described with reference to the previous modifications. A reciprocable element 110 is secured to the tension rod 109 intermediate the ends thereof and the opposite ends of this reciprocable element extend within the coils 105, 106. Coils 111 are secured upon the reciprocable element.

It will be understood that if the coils 111 are supplied with direct current the reciprocable element 110 will be maintained at a constant polarity and that if alternating current is supplied to the coils 105, 106, the resultant magnetic fields produced at the successive reversals of current will be such that the reciprocable element will be reciprocated relatively to the coils 105, 106. The tension rod 109 may be adjusted into synchronism with the recurrent impelling forces produced by the action of the coils 105, 106, as already described with reference to the preceding figures.

Similar results may be obtained by supplying direct current to the coils 105, 106 and alternating current to the coils 111 or alternating current suitably regulated as to phase may be supplied to both sets of coils.

Figures 14 and 15 illustrate diagrammatically in plan and sectional elevation respectively the application of an electric reciprocating motor according to the present invention to the operation of the movable jaws of a crusher for ores or other materials. The arrangement of the respective cores and coils thereon is the same as that described in connection with Figure 1 and for convenience the same reference numerals are applied to these parts.

The cores 23 are shown as secured to and between lugs 112 extending inwardly from the end walls 113 of the crusher framework and the cores 26 are shown as secured to and between lugs 114 extending outwardly from the movable crusher jaws 115. These jaws are shown as supported by means of lugs 116 upon the tension rods 117 there being two tension rods for each crusher jaw. Each tension rod will be anchored at its ends in the side members 118 of the crusher frame and each rod may be provided with adjustable tensioning means and with adjustable length delimiting or tuning means or both in a substantially similar manner to that described with reference to Figure 1. These adjustable means are omitted from the figures for the sake of clearness. In the construction as shown two sets of cores and coils thereon are provided for each jaw of the crusher. It will be readily understood that when the coils 25, 28, of the respective cores are supplied with current in any of the ways already described with reference to Figure 1 the jaws 115 will be moved toward and away from each other due to the recurrent attractive or repulsive forces produced acting in conjunction with the synchronized tension rods 117 so that any rock or other material placed between the jaws will be subjected to the crushing action thereof.

The tension means employed need not necessarily take the form of an elastic rod of metal, as rods of other material, for example, wood, may be employed, and also other forms of tension means may be employed. The particular form of tuning or length delimiting means may also be varied within the scope of the invention.

What I claim and desire to secure by Letters Patent is:—

1. An electric reciprocating motor, comprising a reciprocable element, electro-magnetic means associated with said element and adapted when energized to cause vibratory movement thereof, and a resilient element anchored at opposite ends thereof and extending at right angles to the direction of movement of said reciprocable element and connected therewith, and placed under a predetermined longitudinal tension.

2. An electric reciprocating motor, comprising a reciprocable element, electro-magnetic means associated with said element and adapted when energized to cause vibratory movement thereof, a resilient element anchored at opposite ends thereof and extending at right angles to the direction of movement of said reciprocable element and connected therewith and adjustable means at at least one end of said resilient element operative to place said resilient element under predetermined longitudinal tension.

3. An electric reciprocating motor, comprising a reciprocable element, electro-magnetic means associated with said element and adapted when energized to cause movement thereof, a resilient element anchored at opposite ends thereof and extending at right angles to the direction of movement of said reciprocable element and connected therewith and adjustable means co-acting with said resilient element at opposite sides of the central point thereof to establish a definite length of the central portion thereof free to oscillate.

4. An electric reciprocating motor, comprising a supporting element, a tension element in the form of a bar anchored at its ends in said supporting element and placed under a predetermined longitudinal tension, electro-magnetic means carried by one of said elements, and a magnetizable member carried by the other of said elements.

5. An electric reciprocating motor, comprising a supporting element, a vibratable tension element in the form of a bar anchored at its ends in said supporting element, electro-magnetic means carried by one of said elements, a magnetizable member carried by the other of said elements and means for varying the period of vibration of said tension element.

6. An electric reciprocating motor, comprising a supporting element, a tension element in the form of a bar anchored at its ends in said supporting element, electromagnetic means carried by one of said elements, a magnetizable member carried by the other of said elements and clamping means carried by said supporting element and co-acting with said bar to clamp and hold the same at varying points in the length thereof to establish a delimited length thereof which is free to vibrate.

7. An electric reciprocating motor, comprising a supporting element, a tension element in the form of a bar anchored at its ends in said supporting element, electro-magnetic means carried by one of said elements, a magnetizable member carried by the other of said elements and a screw-threaded member threaded into said supporting element and engaging one end of said tension element and operable to vary the tension of said element.

8. An electric reciprocating motor, comprising a supporting element, a tension element in the form of a bar anchored at its ends in said supporting element and placed under predetermined longitudinal tension, and co-operating electromagnets carried by said elements.

9. An electric reciprocating motor, comprising a reciprocable element, co-operating electro-magnetic means, one of which is connected with said element, means supporting the other of said electro-magnetic means, and means for supplying alternating current to one of said electro-magnetic means, and alternating current of different phase to the other of said means.

10. An electric reciprocating motor, comprising an elastic tension rod having a predetermined longitudinal tension, means supporting the same at the ends thereof, a reciprocable element, means connecting the said element with said rod intermediate the ends thereof, an electro-magnet connected with said element, other electro-magnets arranged on opposite sides of the first magnet, means supporting said other electro-magnets, and means for supplying to said other electro-magnets alternating current of the same phase, and to said first magnet current other than current of the same phase.

11. An electric reciprocating motor, comprising a reciprocable element, a magnetizable element, an electro-magnetic element located above said magnetizable element adjacent thereto, one of said elements being connected with the reciprocable element, means supporting the other of said elements, means for energizing said electro-magnetic element to intermittently attract said magnetizable element, and a tension rod anchored at its ends in said supporting means and connected at its central portion to said reciprocable element, said rod being placed under a predetermined longitudinal tension such as to cause the rod to vibrate said reciprocable element in synchronism with the attractive forces applied to said element by said electro-magnetic element.

12. An electric reciprocating motor, comprising a predetermined mass to be vibrated in space, a vibratory element mounted for vibratory movement and itself supporting said predetermined mass and arranged in itself to be capable of imparting to said predetermined mass vibratory movement at a predetermined frequency, and electro-magnetic means associated with said vibratory element and operative to maintain said element in vibratory movement at said predetermined frequency.

13. An electric reciprocating motor, comprising a vibratory element anchored against movement at each end thereof and capable of vibrating at its middle portion in a direction transverse to its length and arranged to maintain a predetermined vibratory weight in vibratory movement at a predetermined frequency, and electro-magnetic means associated with said vibratory element at the middle portion thereof and operative to maintain said element in vibratory movement at said predetermined frequency.

14. The combination with a predetermined mass to be vibrated, of a vibratory means mounted for vibratory movement and connected with and entirely supporting said mass, and an electro-magnetic means associated with said vibratory means, the latter means being arranged to be deflected to opposite sides of a neutral position by the actuating forces of said electro-magnetic means and the inertia of itself and of said mass respectively, and being arranged when so deflected to develop within itself restoring forces capable of restoring itself and said mass to neutral position in the same time as taken to deflect it from said position.

15. The combination with a member to be vibrated, of a vibratory means in the form of a bar element fixedly mounted at its ends and capable of vibrating at its middle portion and connected at said middle portion with said member, and electro-magnetic means associated with said bar element and operative to cause vibratory movement thereof, said bar element being arranged to be deflected to opposite sides of a neutral position by the actuating forces of said electro-magnetic means and the inertia of itself and of said member respectively, and being arranged when so deflected to develop within itself restoring forces capable of restoring itself and said member to neutral position in the same time as taken to deflect it from said position.

16. An electric reciprocating motor, comprising an element having predetermined mass, electro-magnetic means associated with said element and arranged to apply actuating forces to said element to cause movement of the same at a predetermined frequency, and a vibratory element connected to said element and arranged to have a period of vibration and actuating force such that it is capable in itself of imparting vibratory movement to said predetermined mass in synchronism with the movements imparted thereto by said electro-magnetic means.

17. An electric reciprocating motor, comprising supporting means, a reciprocable element, electro-magnetic means carried by said supporting means for imparting movement to said element at a predetermined frequency, and tension means mounted in said supporting means and connected with said element, said tension means serving as the sole support of said element and being placed under a predetermined initial tension such that it will impart vibratory movement to said element in synchronism with the movement imparted thereto by said electro-magnetic means.

18. An electric reciprocating motor, comprising supporting means, an element of predetermined mass, electro-magnetic means carried by said supporting means for imparting movement to said element at a predetermined frequency, tension means mounted in said supporting means and connected with and constituting the sole support of said element, and adjustable means between said supporting means and said tension means operative to place said tension means under a predetermined initial tension such that it will itself impart vibratory movement to said predetermined mass in synchronism with the movement imparted thereto by said electro-magnetic means.

19. An electric reciprocating motor, comprising a reciprocable element, electro-magnetic means for imparting movement to said element at a predetermined frequency, tension means connected with said element and placed under a predetermined tension, and adjustable tuning means for delimiting a definite length of said tensioned means, such that the same will impart vibratory movement to said element in synchronism with the movement imparted thereto by said electro-magnetic means.

20. An electric reciprocating motor, comprising a reciprocable element, electro-magnetic means for imparting to said element movements at a given frequency, means connected with said element and in itself having a definite period of vibration such as to impart vibratory movement to said element in synchronism with the movements imparted thereto by said electro-magnetic means, and adjustable means for fixing the length of said means which is free to vibrate to determine the period of vibration of said means.

21. An electric reciprocating motor, comprising supporting means, a vibratory element fixed at each of its ends in said supporting means and capable of vibrating transversely of its length and placed under a longitudinal tension such as to cause the same to vibrate with a predetermined frequency, and electro-magnetic means associated with said element and operative to apply actuating forces to said element at a frequency such as to maintain said element in vibration at said predetermined frequency.

22. Vibrating mechanism, comprising a frame member to be vibrated, supporting members at opposite sides of said frame member, a supporting frame, vibrator elements at opposite sides of said supporting frame, anchored at the ends thereof in said frame and connected at the central portions thereof to said supporting members, a magnetizable member carried by each of said supporting members, and electro-magnetic means supported by said supporting frame and co-operating with said magnetizable members and operative to apply intermittent attractive forces to said members, said vibrator elements being arranged to cause vibratory movement of said supporting members and frame member in synchronism with the frequency of said attractive forces.

23. Vibrating mechanism, comprising supporting means, vibratory means anchored against movement at both ends thereof in said supporting means and capable of vibrating at the middle portion thereof in a direction transverse to its length, a frame to be vibrated connected to said vibratory means at said middle portion thereof and supported solely by said vibratory means, said means being of such form as to be capable of itself of imparting vibratory movement to said frame at a predetermined frequency, and electro-magnetic means associated with said vibratory means and operative to apply actuating forces thereto at a frequency such as to maintain said means in vibration at said predetermined frequency.

24. Vibrating mechanism, comprising supporting means, vibratory means anchored at the ends thereof in said supporting means and capable of vibrating at the middle portion thereof, a frame to be vibrated connected to said vibratory means at said middle portion thereof and supported solely by said vibratory means, means on said supporting means operative to place said vibratory means under predetermined longitudinal tension such as to impart vibratory movement to said frame at a predetermined frequency, and electro-magnetic means associated with said vibratory means and operative to apply actuating forces thereto at a frequency such as to maintain said means in vibration at said predetermined frequency.

25. Vibrating mechanism, comprising supporting means, vibratory means anchored against movement at both ends thereof in said supporting means and capable of vibrating at the middle portion thereof, a frame to be vibrated connected to said vibratory means at said middle portion thereof and supported solely by said vibratory means, means on said supporting means operative to delimit a definite length of said vibratory means which is free to vibrate, such that said vibratory portion of itself will impart vibratory movement to said frame at a predetermined frequency, and electro-magnetic means associated with said vibratory means and operative to apply actuating forces thereto at a frequency such as to maintain said means in vibration at said predetermined frequency.

26. An electric reciprocating motor, comprising a predetermined mass to be vibrated, resilient means connected to and solely supporting said predetermined mass and, mounted so as to be capable of being deflected to opposite sides of a neutral position, an electro-magnetic means mounted in cooperative relation with said resilient means and adapted when energized to apply actuating forces such as to cause repeated deflection of said resilient means from said neutral position at a predetermined frequency, said resilient means being structurally arranged upon deflection thereof from neutral position to develop within itself a restoring force of such magnitude as to restore itself and said predetermined mass to said neutral position in the same time as taken to deflect said means from said neutral position.

27. An electric reciprocating motor, comprising a predetermined mass to be vibrated, a supporting means, a resilient means connected to and solely supporting said predetermined mass and fixed at both ends thereof in said supporting means and capable of being repeatedly deflected at its middle portion in opposite directions from a neutral position, an electro-magnetic means mounted on said supporting means in operative association with said resilient means and adapted when energized to apply actuating forces such as to cause repeated deflection of said resilient means from said neutral position at a predetermined frequency, said resilient means being structurally arranged upon deflection thereof from neutral position to develop within itself a restoring force of such magnitude as to restore itself and said predetermined mass to said neutral position in the same time as taken to deflect said means from said position.

28. An electric reciprocating motor, comprising a reciprocable element, a pair of electro-magnets located adjacent each other, one of said magnets being connected with said element, means supporting the other of said magnets, and means for energizing both of said magnets to cause alternate attraction and repulsion of the magnet connected with said element, and a vibratable tension element also connected with said reciprocable element, and mounted to vibrate in a direction transverse to its length and initially placed under a predetermined tension such as to cause said element to vibrate in synchronism with the impulses imparted thereto by said electromagnets.

29. A reciprocable electric motor comprising a reciprocable element, a magnetizable element connected therewith, an electro-magnetic element located adjacent said magnetizable element, means for energizing said electro-magnetic element to intermittently attract said magnetizable element, and elastic tension means connected to said reciprocable element, and mounted to vibrate in a direction transverse to its length, and initially placed under predetermined tension such as to cause said element to vibrate in synchronism with the attractive forces applied thereto by said electro-magnetic element.

In testimony whereof I affix my signature.

JOHN A. TRAYLOR.